(12) United States Patent
Heaney

(10) Patent No.: US 12,233,459 B1
(45) Date of Patent: Feb. 25, 2025

(54) BINDER TRAP SYSTEM

(71) Applicant: Donald Francis Heaney, Port Matilda, PA (US)

(72) Inventor: Donald Francis Heaney, Port Matilda, PA (US)

(*) Notice: Subject to any disclaimer, the term of this patent is extended or adjusted under 35 U.S.C. 154(b) by 67 days.

(21) Appl. No.: 18/091,457

(22) Filed: Dec. 30, 2022

Related U.S. Application Data

(60) Provisional application No. 63/361,669, filed on Jan. 13, 2022.

(51) Int. Cl.
| | |
|---|---|
| *B22F 3/10* | (2006.01) |
| *B22F 3/00* | (2021.01) |
| *B33Y 40/20* | (2020.01) |
| *F27B 17/00* | (2006.01) |
| *F27D 7/02* | (2006.01) |
| *F27D 19/00* | (2006.01) |

(52) U.S. Cl.
CPC ............ *B22F 3/1021* (2013.01); *B22F 3/003* (2013.01); *F27B 17/0016* (2013.01); *F27D 7/02* (2013.01); *B22F 2203/11* (2013.01); *B22F 2998/10* (2013.01); *B33Y 40/20* (2020.01); *F27D 2019/0053* (2013.01)

(58) Field of Classification Search
CPC ...... B22F 3/1021; B22F 3/1025; B22F 3/003; B22F 10/64; F27B 5/06; F27B 5/16
See application file for complete search history.

(56) References Cited

U.S. PATENT DOCUMENTS

2020/0376547 A1* 12/2020 Silidker .................... B22F 1/10

* cited by examiner

*Primary Examiner* — Ricardo D Morales
(74) *Attorney, Agent, or Firm* — John J. Elnitski, Jr.

(57) ABSTRACT

A binder trap system that has more than one binder trap. All of the binder traps are independently connected to a chill unit. The chill unit provides chilled fluid at a precise temperature to chill contents of the binder traps. All of the binder traps are independently connected to a heat unit. The heat unit provides heated fluid at a precise temperature to heat contents of the binder traps. The binder trap system has the capability to independently be chilled or heated from all of the other binder traps in the system.

12 Claims, 3 Drawing Sheets

BINDER TRAP SYSTEM

BACKGROUND

The field of invention generally relates to sintering furnaces. More specifically, the present invention relates to a binder trap system for sintering furnaces.

Binders are routinely added to metal and ceramic powders to facilitate forming and shaping of three dimensional shapes. The shapes can be ornamental or parts to be used in a device. The binder is used to bind the powders into a shape that can be handled and further processed. The binders are waxes or other common polymers that can be removed during heating of the shapes to a sintering temperature in a sintering furnace. The binders decompose at temperatures below the sintering temperature and gas off from the shapes during the sintering process of the shapes. The sintering process in a furnace transforms the shapes through metallic bonding from a weak structure to a strong structure. This processing of the shapes is often competitive in properties with shapes attained via other manufacturing routes.

Binder trap systems that cool and heat binder traps are available for sintering furnaces. The binder traps recover waste binder gassed off from the shapes processed in a sintering furnace. Where cooling the binder in a gas form causes the binder to condense in the trap. Some binder traps include a medium inside the trap to capture the binder. Examples of the medium are things such as metals particles or steel wool. Where cooling the binder in a gas form causes the binder to condense onto the medium. Cooling is done with passive chilling using water from a typical water source which is not temperature controlled. This results in variability of the cooling temperature. The traps are cooled using lower temperature water in the winter and warmer temperature water in the summer. This is due to the fluctuation in water temperature obtained passively from a water source. This variation in water temperature results in more binder being trapped in the winter, but less binder being trapped in the summer. Important issues are that untrapped binder will then reach the pump of the system and potentially damage the pump and/or the untrapped binder will reach the furnace exhaust and spread into the atmosphere. Heating the trap is done while the system is not running using an inefficient electrical heating source to melt and collect the binder from the trap. Furthermore, the trap can't be cleaned while the system is running. There are multi trap systems, but cleaning still cannot be performed while the furnace is running. The multiple traps are filled one after the next and then must all be cleaned with the furnace shut down, which reduces production run time of the furnace and manufacturing efficiency.

It is an object to provide a system to improve efficiency and environmental impact of the sintering furnace by isolating binder traps while the furnace is running.

SUMMARY OF THE INVENTION

A binder trap system that has more than one binder trap. All of the binder traps are independently connected to a chill unit. The chill unit provides chilled fluid at a precise temperature to chill contents of the binder traps. All of the binder traps are independently connected to a heat unit. The heat unit provides heated fluid at a precise temperature to heat contents of the binder traps. The binder trap system has the capability to independently be chilled or heated from all of the other binder traps in the system.

DETAILED DESCRIPTION

Figure 1:
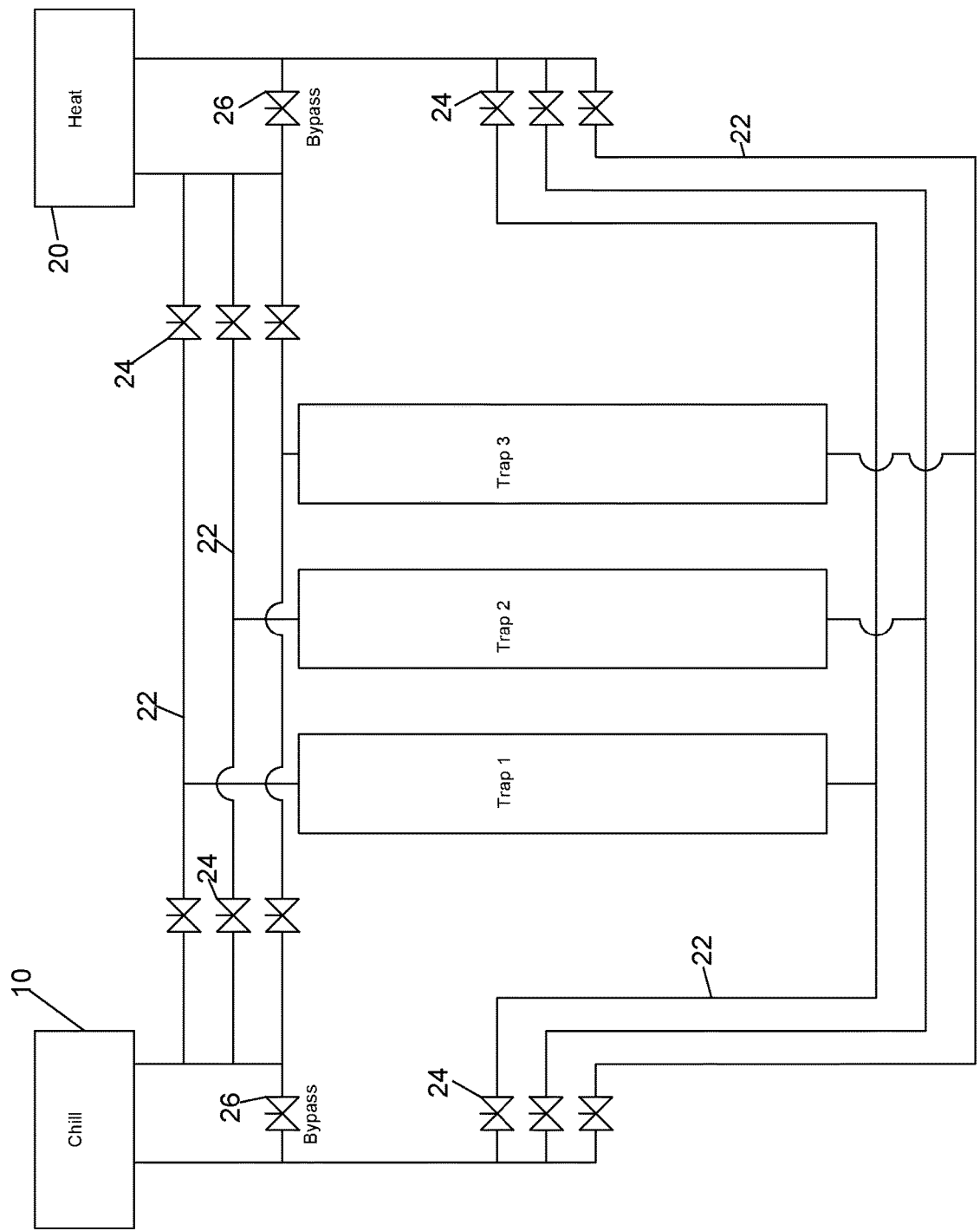
FIG. 1 is a schematic view of piping and valving to multiple binder traps according to the present invention.

The present invention is a binder trap system and method of use to capture and remove binder material from sintering furnaces. The binder trap system provides green technology that traps a greater amount of carbon based polymer chains from escaping from the exhaust. The binder trap system can be used with metal injection molding, tungsten carbides, binderjet metal printing, and any other binder assisting forming process that requires thermal removal of polymer based binders. The binder trap system allows the removal of binder without shutting down the sintering furnace. The binder trap system provides protection of pumps used to move the binder in a gas form. The binder trap system includes multiple binder traps, a fluid, a fluid chiller and a fluid heater. Examples and discussion of the system will show a three trap configuration of the system, but the system could be used with two or more binder traps connected to the sintering furnace. FIG. 1 shows a schematic of fluid connections to a three trap configuration. FIG. 1 shows representation of a chill unit 10 and a heat unit 20. The chill unit 10 provides chilled fluid to the system for cooling at a precise cooling temperature. The chill unit 10 can be any means that can be used to chill fluid, for example refrigeration of the fluid using convective air flow can be employed. A heat unit 20 provides heated fluid for heating at a precise heating temperature. The heat unit 20 can be any means that can be used to heat fluid, for example an electric heating element can by employed. The system uses precision control of temperature for choosing the correct temperature to trap binders due to binders having different precipitation temperatures. This can including placing thermocouples throughout the system to monitor fluid temperature. The chill unit 10 and heat unit 20 are connected with a piping configuration of pipes 22, valves 24 and bypasses 26 that allow all three traps to separately be chilled or heated at the same time by interacting with thermal units that are part of the binder traps. It also allows individual traps to be isolated to be chilled or heated independent of the other traps. In this way the system can have a trap or multiple traps chilling to condense the binder and the other trap or traps heating to thermally melt the condensed binder for removal. The bypass 26 can be used to allow flow of the chilling fluid and heating fluid without sending the fluid to any of the traps. Each trap will have a thermal unit to receive the temperature controlled fluid and allow cooling or heating of the trap through thermal exchange.

Figure 2:
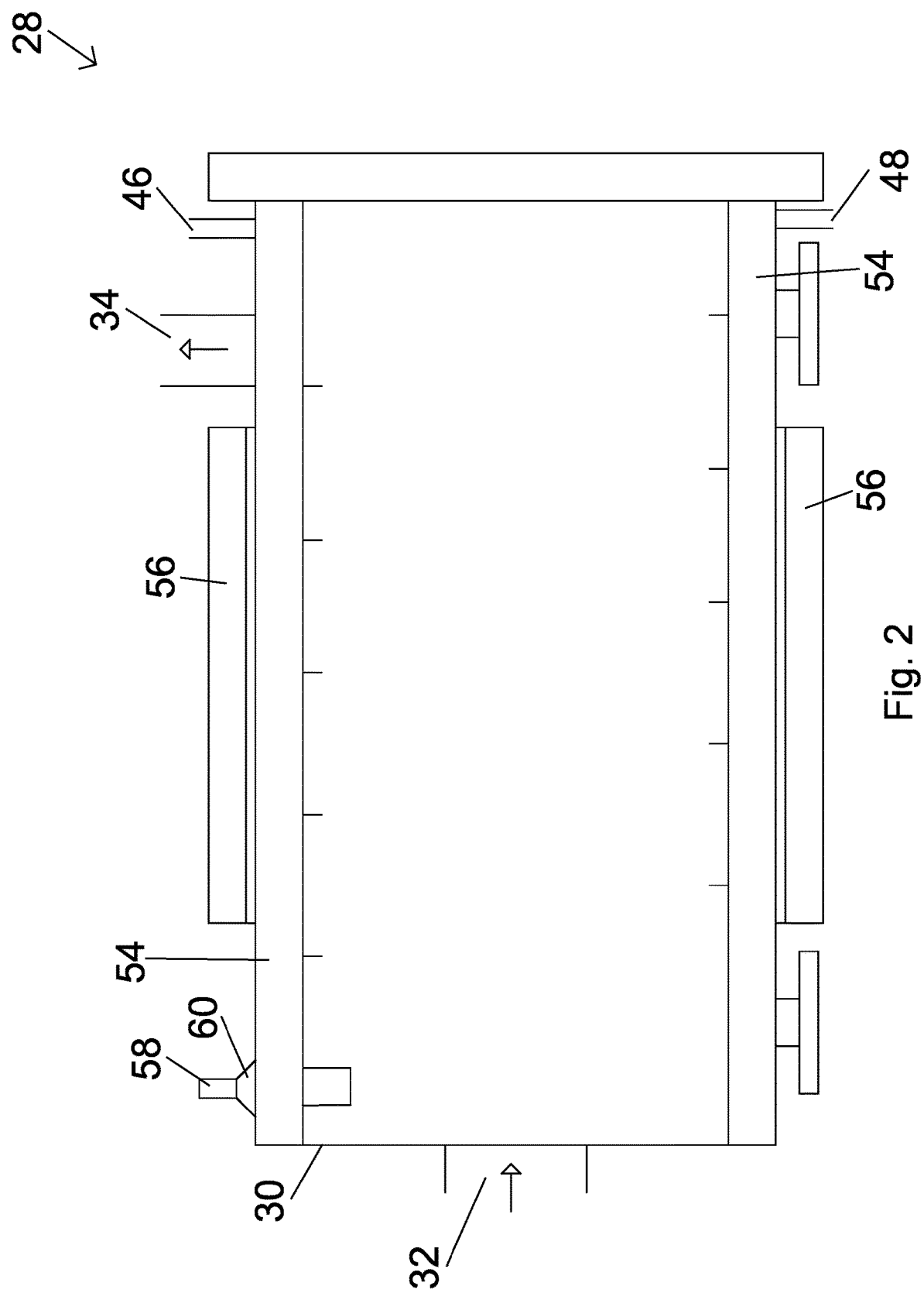
FIG. 2 is a schematic cross sectional view of components of a binder trap according to the present invention.
Figure 3:
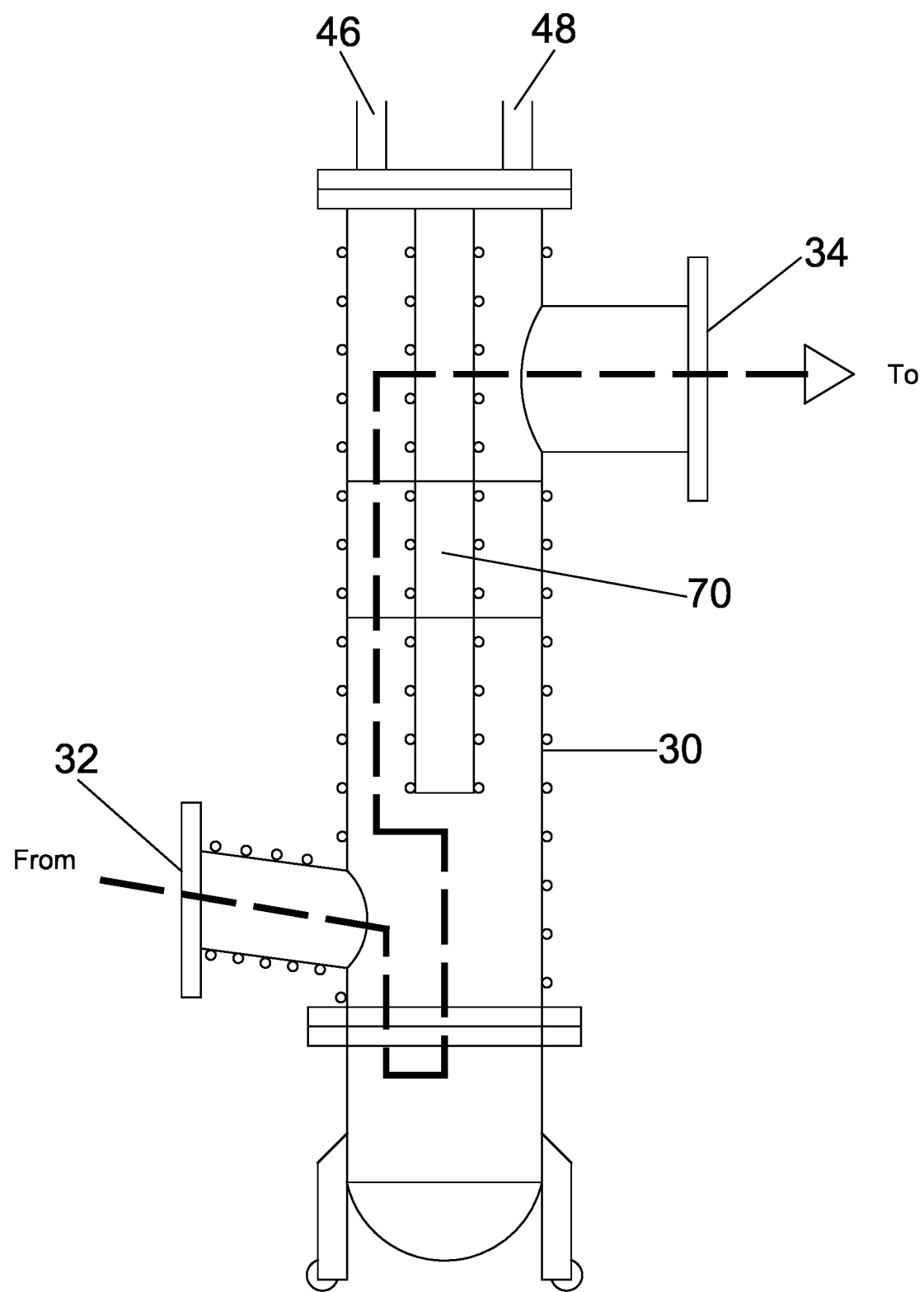
FIG. 3 is a schematic cross sectional view of components of another binder trap according to the present invention.

FIG. 2 shows a schematic cross section example of a binder trap 28 to be used with the system. The binder trap 28 includes a housing 30 to which all of the other components of the binder trap 28 are attached. The housing 30 is hollow and showed to operate with the length of the tube in a horizontal orientation, but there are also housings oriented in a vertical direction. The housing 30 includes a gas entrance 32 and a gas exit 34 for pumping the binder laden gas through the binder trap 28. FIG. 2 shows a fluid entrance 46 and a fluid exit 48 as part of fluid jacket 54 wrapped about the outside surface of the housing 30 of binder trap 28 for cooling and heating the contents of the housing 30. The fluid jacket 54 is one of many thermal units that can be employed for heating and cooling of the contents of the binder trap 28. The fluid entrance 46 allows for the entrance of a temperature controlled fluid into the fluid jacket 54 from either the chill unit 10 or the heat unit 20 of FIG. 1. The fluid exit 48 allows for the fluid exit from the fluid jacket 54 after a thermal exchange between the fluid and contents internal of the housing 30 and allows the return of the fluid to the chill unit 10 or the heat unit 20. There can also be an electric heater employed within thermal unit. FIG. 2 also shows heater blanket material 56 wrapped about the outside surface of the fluid jacket 54 to retain heat during the heating of the contents of the housing 30. FIG. 2 shows the binder trap 28 with a thermocouple device 58 attached within the housing 30 through a thermocouple sleeve 60. There can also be thermocouples employed in different locations within the traps and within the piping and the locations of the fluid flowing in and out of the thermal units to increase precision control of the fluid temperature in the thermal units. FIG. 3 shows another type of binder trap 28 that operates in a vertical orientation with a gas entrance 32 and gas exit 34 as part of the housing 30. The binder trap 28 includes an internal thermal unit 70. The internal thermal unit 70 includes a fluid entrance 46 and a fluid exit 48 as part of thermal unit 70 that operates in the same way as fluid jacket 54, only providing thermal exchange internally to the binder trap 28. There can also be electrical heaters within the thermal unit 70. FIG. 3 as shows a fluid tube wrapped around the thermal unit 70 which receives fluid from the fluid entrance 46 for additional thermal exchange.

The process of using the multiple binder traps of FIG. 1 starts with pumping down the sintering furnace system to pull vacuum on sintering chamber and debind chambers on initial startup. When the debind process to remove binder is activated, one or more of the traps are chilled, where trap 1 is the initial trap to be used and traps 2 and 3 isolated. The traps are chilled using the precisely temperature controlled chilled fluid from the chill unit 10 of FIG. 1, where the chilled fluid flows through any thermal units that are part of the binder trap. At this time, trap 1 is active and the gas carrying the gas phase polymer from sintering chamber flows thru Trap 1 using the gas entrance and gas exit of the trap, as shown in FIG. 2. Trap 1 captures binder by condensing the binder inside the trap until the trap is full of binder. A trap being full of binder is signaled by an increase in chamber pressure or the opening of a modulating valve at the pump inlet.

With trap 1 full, trap 2 is activated by a valve opening and allowing the binder laden gas from the sintering chamber to flow thru trap 2 for additional trapping of the binder. During the activation of trap 2, trap 1 is isolated from the gas flow and trap 1 is heated using a thermal unit attached to the binder trap to melt the binder from the contents inside the housing tube 30. The trap is heated using precisely temperature controlled heated fluid from the heat unit 20 of FIG. 1, where the heated fluid flows through the thermal unit. The binder traps can also be heated using emersion heater 50 or the heater blanket material 56 or both if so equipped. The heated binder in the heated trap flows to the bottom of the trap due to gravity.

When modulating or throttle valve opens or pressure of chamber increase, signifying Trap 2 is clogged with binder and full, trap 3 is activated to receive the gas flow. When trap 3 is activated, trap 2 is isolated and heated as described above for trap 1. During the use of trap 3, trap 1 begins being chilled once again. When trap 3 is clogged with binder and full, the sequence restarts so that the gas flows through trap 1 and trap 3 is heated. Trap 2 begins being chilled once trap 1 is receiving gas flow. After debinding is complete and only sintering is occurring in the furnace, any one of the traps can be heated to drain and clean the trap, once the trap has too much binder laying on the bottom of the trap. During trap heating the thermocouple device 58 in trap of FIG. 2 can used to monitor the melting of the binder to a liquid form when temperature is above a set point. Monitoring thermocouples employed in different locations within the traps and within the locations of the fluid flowing in and out of the thermal units allows for the increase of precision control of the fluid temperature in the thermal units.

Current binder trap technology does not allow for binder trap cleaning while the furnace is running in a furnace system that has only one trap. A typical debinding and sintering furnace functions by having the binder laden gas flow thru the binder traps until the binder is removed from the work in the furnace chamber. The techniques applied to multiple traps described above can also be used with a single trap system, where the single binder trap is isolated so the binder can be removed while the sintering is occurring. The binder trap is isolated and the gas bypasses the trap to flows directly thru the pump and into the exhaust. This keeps the higher temperature sintering gas from flowing across the binder and being carried out of in the exhaust. The process starts with the gas flowing thru binder trap as binder is being cooled. After binder is removed and the furnace is still running, the binder trap is isolated from the gas flow when there is no more binder to capture with the gas from the furnace. The gas flows directly to exhaust. The isolated binder trap is switched from cooling to heating for melting the binder in the trap, while the sintering chamber is going to high sintering temperatures. The melted binder is removed from the trap and the trap is then ready for next run after the sintering cycle of the furnace is complete.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A method of debinding using a binder trap system having at least two binder traps by removing binder from binder laden gas evacuated from a sintering furnace, comprising:

cooling the contents of at least one of the binder traps receiving the binder laden gas in order to condense the binder from the binder laden gas inside the binder trap being cooled as the binder laden gas flows through the cooled trap so that the cooled trap retains the binder from the binder laden gas;

isolating at least one binder trap that has been cooled so that gas flowing from furnace bypasses the isolated binder trap, allowing gas flowing from furnace to continue to flow to other binder traps without shutting down the furnace;

switching from cooling the isolated trap to heating the isolated trap for melting the binder in the trap and allowing the melted binder to drain; and switching the isolated trap back to receiving binder laden gas from the furnace, so that another binder trap may be isolated.

2. A method of debinding using a binder trap system by removing binder from binder laden gas evacuated from a sintering furnace, comprising:

attaching at least two binder traps to a sintering furnace, so that at least one trap can be isolated from the gas flow from the furnace while continuing to use the other traps;

connecting all of the binder traps independently to a chill unit, where the chill unit provides chilled fluid at a precise temperature to chill contents of the binder traps;

connecting all of the binder traps independently to a heat unit, where the heat unit provides heated fluid at a precise temperature to heat contents of the binder traps;

removing the binder laden gas from the sintering furnace and transferring the binder laden gas to at least one of the binder traps;

chilling the contents of the binder traps receiving the binder laden gas in order to condense the binder from the binder laden gas inside the traps as the binder laden gas flows through traps so that the traps retain the binder from the binder laden gas by sending chill fluid from the chill unit to the traps;

switching the flow of the binder laden gas from a first trap to a second trap without shutting down the furnace, chilling the contents of the second trap receiving the binder laden gas in order to condense the binder from the binder laden gas inside the second trap as the binder laden gas flows through the second trap so that the second trap retains the binder from the binder laden gas by sending chilled fluid from the chill unit to the second trap, heating the first trap from where the binder laden gas flow was removed by sending heated fluid from the heat unit to the first trap to melt the binder from the contents of the first trap so that the binder flows to the bottom of the first trap due to gravity; and switching the flow of the binder laden gas back from the second trap to the first trap without shutting down the furnace, chilling the contents of the first trap receiving the binder laden gas in order to condense the binder from the binder laden gas inside the first trap as the binder laden gas flows through the first trap so that the first trap retains the binder from the binder laden gas by sending chilled fluid from the chill unit to the first trap, heating the second trap from where the binder laden gas flow was removed by sending heated fluid from the heat unit to the second trap to melt the binder from the contents of the second trap so that the binder flows to the bottom of the second trap due to gravity.

3. The method of claim 2, further including prechilling the first trap to receive the binder laden gas by sending chilled fluid to the first trap to be used.

4. The method of claim 2, further including prechilling all of traps to receive the binder laden gas.

5. The method of claim 2, further including prechilling trap before the trap starts to receive the binder laden gas.

6. The method of claim 2, further including chilling the chill fluid to the temperature best suited to condense the type of binder to be removed the binder laden gas.

7. The method of claim 2, further including adding traps beyond the second trap to be added to system and used for condense and melting the binder before returning to send the flow of the binder laden gas to the first trap.

8. The method of claim 2, wherein the binder trap includes a thermal unit connected to a housing of the binder traps and adapted to thermally influence contents within the housing, a fluid entrance to provide an entrance to the thermal unit and adapted to receive temperature controlled fluid in the thermal unit to provide thermal exchange with the thermal unit; and a fluid exit from the thermal unit adapted to allow removal of the fluid provided at the fluid entrance after the thermal exchange with the thermal unit.

9. The method of claim 8, wherein the thermal unit is inside the housing of the binder trap.

10. The method of claim 8, wherein the thermal unit is a thermal jacket outside the binder trap.

11. The method of claim 2, further including monitoring multiple thermocouples employed in different locations within the traps and within the locations of the flowing fluid to allow for the increase of precision control of the fluid temperature during heating and cooling.

12. The method of claim 8, further including monitoring thermocouples employed in different locations within the traps and within the locations of the flowing fluid to allow for the increase of precision control of the fluid temperature in the thermal units.

* * * * *